(12) United States Patent
Rajagopal (10) Patent No.: US 8,265,200 B2
(45) Date of Patent: Sep. 11, 2012

(54) METHOD AND SYSTEM FOR RECEIVER SYNCHRONIZATION

(75) Inventor: Ravikiran Rajagopal, Yardley, PA (US)

(73) Assignee: Broadcom Corporation, Irvine, CA (US)

( * ) Notice: Subject to any disclaimer, the term of this patent is extended or adjusted under 35 U.S.C. 154(b) by 386 days.

(21) Appl. No.: 12/546,517

(22) Filed: Aug. 24, 2009

(65) Prior Publication Data

US 2010/0124300 A1 May 20, 2010

Related U.S. Application Data

(60) Provisional application No. 61/116,532, filed on Nov. 20, 2008.

(51) Int. Cl.
*H04L 27/00* (2006.01)

(52) U.S. Cl. .................. 375/326; 375/260; 375/365

(58) Field of Classification Search .................. 375/130, 375/132–136, 259–260, 295, 316, 322–326, 375/340–343, 354
See application file for complete search history.

(56) References Cited

U.S. PATENT DOCUMENTS

| | | | |
|---|---|---|---|
| 7,881,245 B2* | 2/2011 | Vijayan et al. | 370/312 |
| 2005/0135308 A1* | 6/2005 | Vijayan et al. | 370/330 |
| 2008/0291817 A1* | 11/2008 | Gupta | 370/208 |
| 2010/0014600 A1* | 1/2010 | Li et al. | 375/260 |
| 2010/0226334 A1* | 9/2010 | Ma et al. | 370/329 |

\* cited by examiner

*Primary Examiner* — David C. Payne
*Assistant Examiner* — James M Perez
(74) *Attorney, Agent, or Firm* — Thomas, Kayden, Horstemeyer & Risley LLP.

(57) ABSTRACT

Provided is a method for synchronizing a multiple carrier receiver to receive a transmitted signal. The method includes determining a location of one or more scattered pilot carriers in a received symbol sequence and modulating the scattered pilot carriers in accordance with a single pseudorandom binary sequence. The method also includes performing phase error correction via the modulated scattered pilot carriers.

16 Claims, 6 Drawing Sheets

METHOD AND SYSTEM FOR RECEIVER SYNCHRONIZATION

CROSS-REFERENCE TO RELATED APPLICATIONS/INCORPORATION BY REFERENCE

This patent application makes reference to, claims priority to and claims benefit from U.S. Provisional Patent Application Ser. No. 61/116,532 filed on Nov. 20, 2008.

The above stated application is hereby incorporated herein by reference in its entirety.

FIELD OF THE INVENTION

The present invention generally relates to digital video broadcasting (DVB). More specifically, the present invention relates to synchronizing transmitted data in a multi-carrier modulation based receiver used in a DVB system.

BACKGROUND OF THE INVENTION

DVB is the European consortium standard for the broadcast transmission of digital terrestrial television. DVB systems transmit a compressed digital audio/video stream, using multi-carrier modulation, such as orthogonal frequency division multiplexing (OFDM). Another popular method of transmitting signals is digital video broadcasting-terrestrial (DVB-T). When broadcasters employ DVB-T, the transmitted signals do not travel via cable. Instead, they move via aerial antennas to a home based receiver.

DVB-T broadcasters transmit data with a compressed digital audio-video stream using a process based on a Moving Picture Expert Group (MPEG)-2 standard. These transmissions can include all kinds of digital broadcasting, including high definition television (HDTV). MPEG-2 signals represent an improvement over the older analog signals, which require separate streams of transmission.

By way of background, in multi-carrier systems, such as OFDM systems, serially-inputted symbol streams are divided into unit blocks. The symbol streams of each unit block are converted into N number of parallel symbols. After the conversion, these symbols, which include data, are multiplexed and added by using a plurality of subcarriers having different frequencies, respectively, according to an Inverse Fast Fourier Transform (IFFT) technique, and are transmitted via the channel in time domain.

In addition to data, these OFDM symbols also include scattered pilot carriers (SPC), continuous pilot carriers (CPC), and reserve tone pilot carriers. These pilot carriers (signals) are used for frame synchronization, frequency synchronization, time synchronization, channel estimation, transmission mode identification, and/or phase noise tracing. The data and the pilot carriers constitute the useful part of the OFDM symbol. As understood by those of skill in the art, these OFDM symbols also include less useful portions, such as a guard interval.

Once the OFDM symbols are captured on a receiver side of the OFDM system, they must be demodulated. OFDM demodulation procedures include, for example, a Fast Fourier Transform (FFT) step, an equalizing and de-interleaving step, and a synchronizing step, among others.

Synchronization of OFDM receivers is performed to locate the useful part of each symbol to which the FFT is to be applied. This synchronization, generally performed in the time domain, can be characterized as coarse synchronization (e.g., initially performed during an acquisition period) and fine synchronization. Fine synchronization improves upon the results achieved during coarse synchronization enough to provide reliable demodulation.

Current techniques for carrier and symbol synchronization during the acquisition period are time-domain based. They also, however, include a significant frequency domain component. That is, although these techniques are primarily time-domain based, portions are performed after application of the FFT. This time domain focus, however, necessitates the use of continuous pilots in order to successfully perform carrier and symbol synchronization.

The time domain component of these traditional techniques does not accommodate the performance of fine frequency offset estimation. Therefore, traditional techniques must perform fine frequency offset estimation in frequency domain. This is achieved by using continuous pilots. It is desirable, however, to perform all aspects of synchronization, including fine frequency offset estimation, in the time domain. Time domain is preferred because it allows for much faster signal acquisition since many more time-consuming steps (such as the estimation of the FFT window) are required before an FFT can be performed.

It is known by those of skill in the art that coarse synchronization can be performed in the time domain. Performing fine synchronization in time domain, however, is not so easily accomplished. Performing fine synchronization in time domain is desirable because of the faster signal acquisition and step reduction advantages noted above. Achieving fine synchronization in the time domain, however, is difficult without the use of the continuous pilots.

One proposed solution for performing fine synchronization in time domain has been to use scattered pilots instead of continuous pilots to perform the phase error correction. That is, pseudorandom sequences are provided to modulate scattered pilots which in turn can be used in a separate process in the time domain. However, for multicarrier systems that use multiple sized FFTs (such as DVB-T2), using pseudorandom sequences in this manner would add extra complexity to the receiver due to the need to receive and process multiple sequences of different sizes.

What is needed, therefore, is an improved pilot sequence structure that can facilitate more efficient receiver synchronization to decrease the complexity of receivers for multi-FFT size specifications. Particularly, what is needed is an improved technique for performing receiver synchronization using a single pilot sequence in time domain.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for receiver synchronization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form part of the specification, illustrate the present

DETAILED DESCRIPTION OF THE INVENTION

Consistent with the principles of the present invention as embodied and broadly described herein, the present invention includes a method for synchronizing a multiple carrier receiver to receive a transmitted signal. The method includes determining a location of one or more scattered pilot carriers in a received symbol sequence and modulating the scattered pilot carriers in accordance with a single pseudorandom binary sequence. The method also includes performing phase error correction via the modulated scattered pilot carriers.

OFDM systems contain both continuous and scattered pilots. For common phase error correction, continuous pilots are used as discussed above. In the present invention, however, instead of using continuous pilots for phase error correction, a modulated scattered pilot sequence is used to enable the performance of both coarse and fine synchronization in the time domain. That is, the continuous pilots can be used to assist and perform fine synchronization in time domain, ultimately reducing receiver complexity.

However, tracking the location of scattered pilots for use in phase error correction can be problematic. That is, scattered pilots are not located in the same carrier index in each symbol. Therefore, to use scattered pilots as a substitute for continuous pilots for phase error correction, one needs to know the actual scattered pilot symbol index or, alternatively, wait for a complete cycle of scattered pilots. The present invention provides an approach to resolving this issue by substituting a Gold sequence, with good autocorrelation properties, in the place of the traditional pseudorandom sequence. Use of the Gold sequence enables synchronization to be achieved completely in the time domain.

Further embodiments, features, and advantages of the present invention, as well as the structure and operation of the various embodiments of the present invention, are described in detail below with reference to the accompanying drawings.

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention.

Thus, the operational behavior of the present invention will be described with the understanding that modifications and variations of the embodiments are possible, given the level of detail presented herein.

Figure 1:
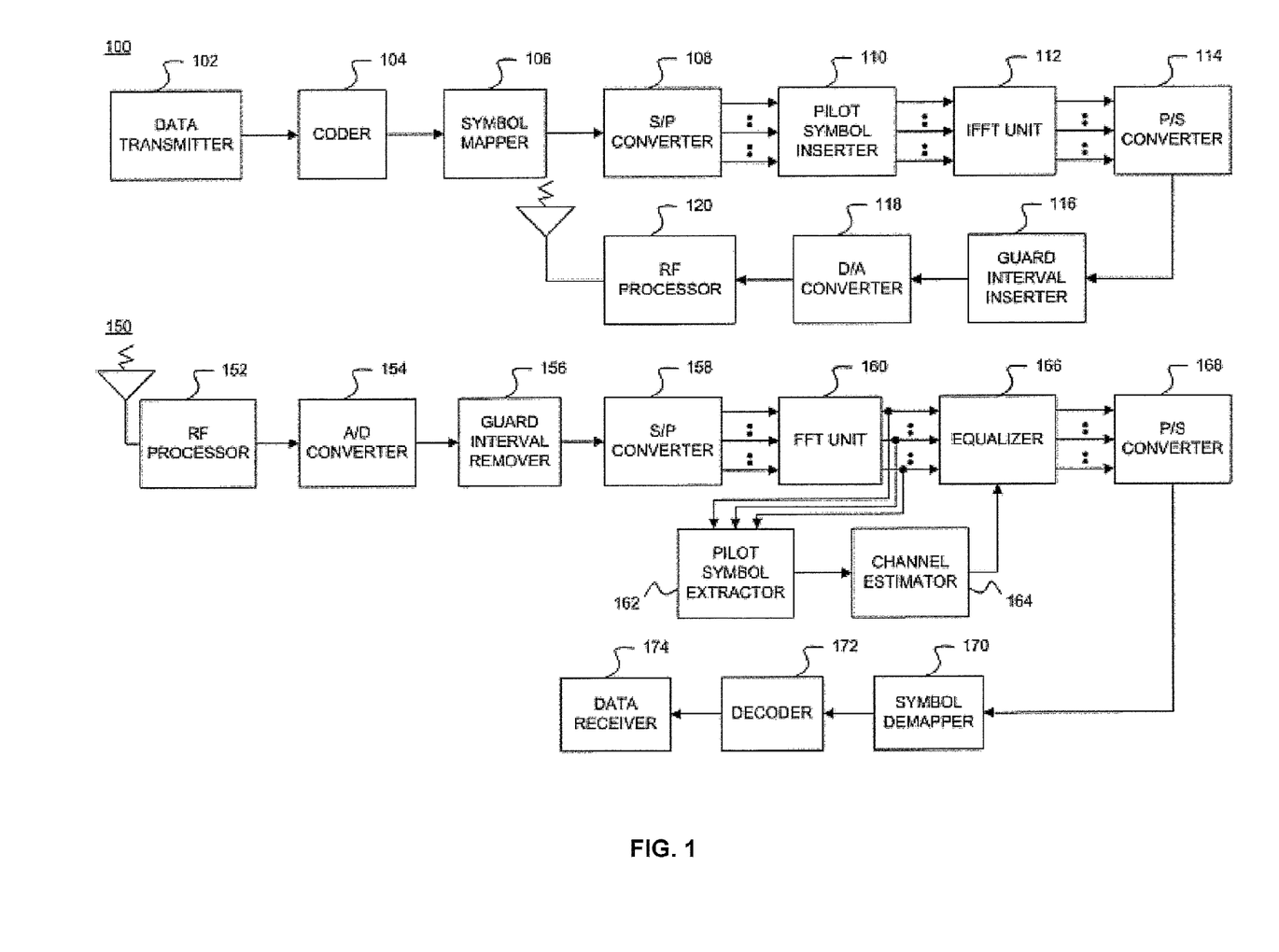
FIG. 1 is a block diagram illustration of a conventional OFDM based DVB-T system.

FIG. 1 is a block diagram illustration of transmission/reception terminals of a conventional OFDM mobile communication system. In FIG. 1, an OFDM based mobile communication system includes a transmission terminal 100 and a reception terminal 150. The transmission terminal 100 includes a data transmitter 102, a coder 104, a symbol mapper 106, a serial to parallel (S/P) converter 108, a pilot symbol inserter 110, an inverse fast Fourier transform (IFFT) unit 112, a parallel to serial (P/S) converter 114, a guard interval inserter 116, a digital-to-analog converter (D/A converter) 118, and a radio frequency (RF) processor 120.

In the transmission terminal 100, the data transmitter 102 generates and outputs user data bits and control data bits to be transmitted to the coder 104. The coder 104 receives and codes the signals output from the data transmitter 102 according to a predetermined coding scheme, and then outputs the coded signals to the symbol mapper 106. The coder 104 may perform coding by means of a convolutional coding scheme or a turbo coding scheme having a predetermined coding rate. The symbol mapper 106 modulates the coded bits output from the coder 104 according to a corresponding modulation scheme, thereby generating modulation symbols, and outputs the modulation symbols to the S/P converter 108. The modulation scheme the symbol mapper 106 may follow includes, e.g., a BPSK (binary phase shift keying) scheme, a QPSK (quadrature phase shift keying) scheme, a 16 QAM (quadrature amplitude modulation) scheme, 64 QAM scheme, or others.

The S/P converter 108 receives and converts the serial modulation symbols output from the symbol mapper 106 into parallel modulation symbols, and outputs the converted parallel modulation symbols to the pilot symbol inserter 110. The pilot symbol inserter 110 inserts pilot symbols into the converted parallel modulation symbols output from the S/P converter 108 and then outputs them to the IFFT unit 112.

The IFFT unit 112 receives the signals output from the pilot symbol inserter 110, performs N-point IFFT for the signals, and then outputs them to the P/S converter 114. The P/S converter 114 receives the signals output from the IFFT unit 112, converts the signals into serial signals, and outputs the converted serial signals to the guard interval inserter 116. The guard interval inserter 116 receives the signals output from the P/S converter 114, inserts guard intervals into the received signals, and then outputs them to the D/A converter 118. The inserted guard interval prevents interference between OFDM symbols transmitted in the OFDM communication system. That is, the inserted guard interval prevents interference between a previous OFDM symbol transmitted during a previous OFDM symbol period and a current OFDM symbol to be transmitted during a current OFDM symbol period.

The D/A converter 118 receives the signals output from the guard interval inserter 116, converts the signals into analog signals, and outputs the converted analog signals to the RF processor 120. The RF processor 120 includes a filter and a front end unit. The RF processor 120 receives the signals from the D/A converter 118, RF-processes the signals, and then transmits the signals over the air through a transmit antenna. The reception terminal 150 is discussed in greater detail below.

The reception terminal 150 includes an RF processor 152, an analog-to-digital converter (A/D converter) 154, a guard interval remover 156, a S/P converter 158, an FFT) unit 160, a pilot symbol extractor 162, a channel estimator 164, an equalizer 166, a P/S converter 168, a symbol demapper 170, a decoder 172, and a data receiver 174.

The signals transmitted from the transmission terminal 100 pass through multipath channels and are received by a receive antenna of the reception terminal 150 in a state in which noise is included in the signals. The signals received through the receive antenna are inputted to the RF processor 152, and the RF processor 152 down-converts the received signals into signals of an intermediate frequency (IF) band, and then outputs the IF signals to the A/D converter 154. The A/D converter 154 converts the analog signals output from the RF processor 152 into digital signals and then outputs the digital signals to the guard interval remover 156.

The guard interval remover 156 receives the digital signals converted by and output from the A/D converter 154, eliminates guard intervals from the digital signals, and then outputs them to the S/P converter 158. The S/P converter 158 receives the serial signals output from the guard interval remover 156, converts the serial signals into parallel signals, and then outputs the parallel signals to the FFT unit 160. The FFT unit 160 performs N-point FFT on the signals output from the P/S converter 158, and then outputs them to both the equalizer 166 and the pilot Symbol extractor 162. The equalizer 166 receives the signals from the FFT unit 160, channel-equalizes the signals, and then outputs the channel-equalized signals to the P/S converter 168. The P/S converter 168 receives the parallel signals output from the equalizer 166, converts the parallel signals into serial signals, and then outputs the converted serial signals to the symbol demapper 170.

As indicated, the signals output from the FFT unit 160 are also inputted to the pilot symbol extractor 162. The pilot symbol extractor 162 detects pilot symbols from the signals output from the FFT unit 160 and outputs the detected pilot symbols to the channel estimator 164. The channel estimator 164 performs channel estimation using the pilot symbols and outputs the result of the channel estimation to the equalizer 166. Here, the reception terminal 150 generates channel quality information (CQI) corresponding to the result of the channel estimation and transmits the CQI to the transmission terminal 100 through a CQI transmitter (not shown).

The symbol demapper 170 receives the signals output from the P/S converter 168, demodulates the signals according to a demodulation scheme corresponding to the modulation scheme of the transmission terminal 100, and then outputs the demodulated signals to the decoder 172. The decoder 172 decodes the signals from the symbol demapper 170 according to a decoding scheme corresponding to the coding scheme of the transmission terminal 100 and outputs the decoded signals to the data receiver 174.

In OFDM systems, data is transmitted and received via multiple carrier frequencies. In some OFDM systems, by way of example, there can be approximately 128 independent OFDM sub-carriers (i.e., tones) that occupy the available bandwidth. In these systems, data is modulated and transmitted via many of these subcarriers. Approximately 10 of the sub-carriers do not necessarily carry information. These sub-carriers, also referred to as pilot tones, can be used to guard the information carrying subcarriers, to simplify the filtering requirements of the system, or to provide reference phase/amplitude information for the demodulator. The positions of the pilot tones may be defined according to the communication standard or defined by the user/designer of the system. Some pilot tones are located on two ends of the frequency spectrum and some of the pilot tones are interspersed within the frequency spectrum.

For each transmitted carrier signal, an OFDM receiver normally attempts to compensate for the distortion induced by the transmission channel. This will normally involve a channel estimation operation and a channel compensation operation. To assist a receiver in overcoming multipath distortion, pilot signals with known data patterns are transmitted. The pilot tones are used to support channel estimation operations. These channel estimation operations normally attempt to estimate the amplitude and phase distortion introduced by the communications channel.

The pattern structure of the pilot tones can be in essentially any manner, provided that the Nyquist sampling criteria for the communication channel's impulse response and rate of change are satisfied. The number of pilot tones transmitted is often a function of the expected multipath distortion delay and the anticipated rate of change in channel conditions. However, for purposes of efficiency, it is desirable to minimize the number of pilot tones transmitted since the transmission of a pilot tone precludes the transmission of data in the transmission slot used to transmit the pilot tone.

DVB-T OFDM systems often use their pilot tones for the purpose of making channel estimation easier. However, the sparseness of these tones renders it difficult to estimate the channel quickly and with efficient memory usage and calculations.

Channel estimation is an important function for modem wireless receivers. With even a limited knowledge of the wireless channel properties, a receiver can gain insight into the information sent by the transmitter. The goal of channel estimation is to measure the effects of the channel on known, or partially known transmissions. A channel can changes channel properties due to changing conditions and topology. OFDM systems are especially suited for estimating these changing channel properties. More specifically, in OFDM systems, the subcarriers are closely spaced and the system is generally used in high speed applications that are capable of computing channel estimates with minimal delay. As noted above, subcarriers that are sent with a known power and make-up are called pilots and are used for synchronization.

The present invention provides a unique and novel approach to performing channel estimation. More particularly, the present invention provides enhancements to known channel estimation techniques, such as tone reservation. In tone reservation, for example, carriers are reserved and populated with arbitrary values in order to decrease the PAPR.

The present invention is illustrated in the following example. Assume that nonarbitrary values can be chosen for carriers that are known. That is, in a given symbol, for example, carriers 3, 7, and 10 are available and instead of using arbitrary values for each of these carriers, five non-arbitrary values (e.g., −2, −1, 0, 1, and 2) can be used. Thus, in this example there are 125 choices (i.e., $5^3$). Assume that each of the 125 choices includes sufficient granularity such that the peak to average power ratio (PAPR) could be decreased by an amount comparable to PAPR reduction using the arbitrary values. In this scenario, the PAPR could be reduced almost as much as it could by using the arbitrary values. By using small sets of non-arbitrary values, however, the receiver has more information with which to perform channel estimates and equalization. The ability to provide this information to the receiver enables these carries to be used as pilots.

Traditionally, only dedicated pilots could be used to provide channel estimates. The present invention enables additional, non-pilot channel carriers, to be used to provide the channel estimates.

Figure 2:
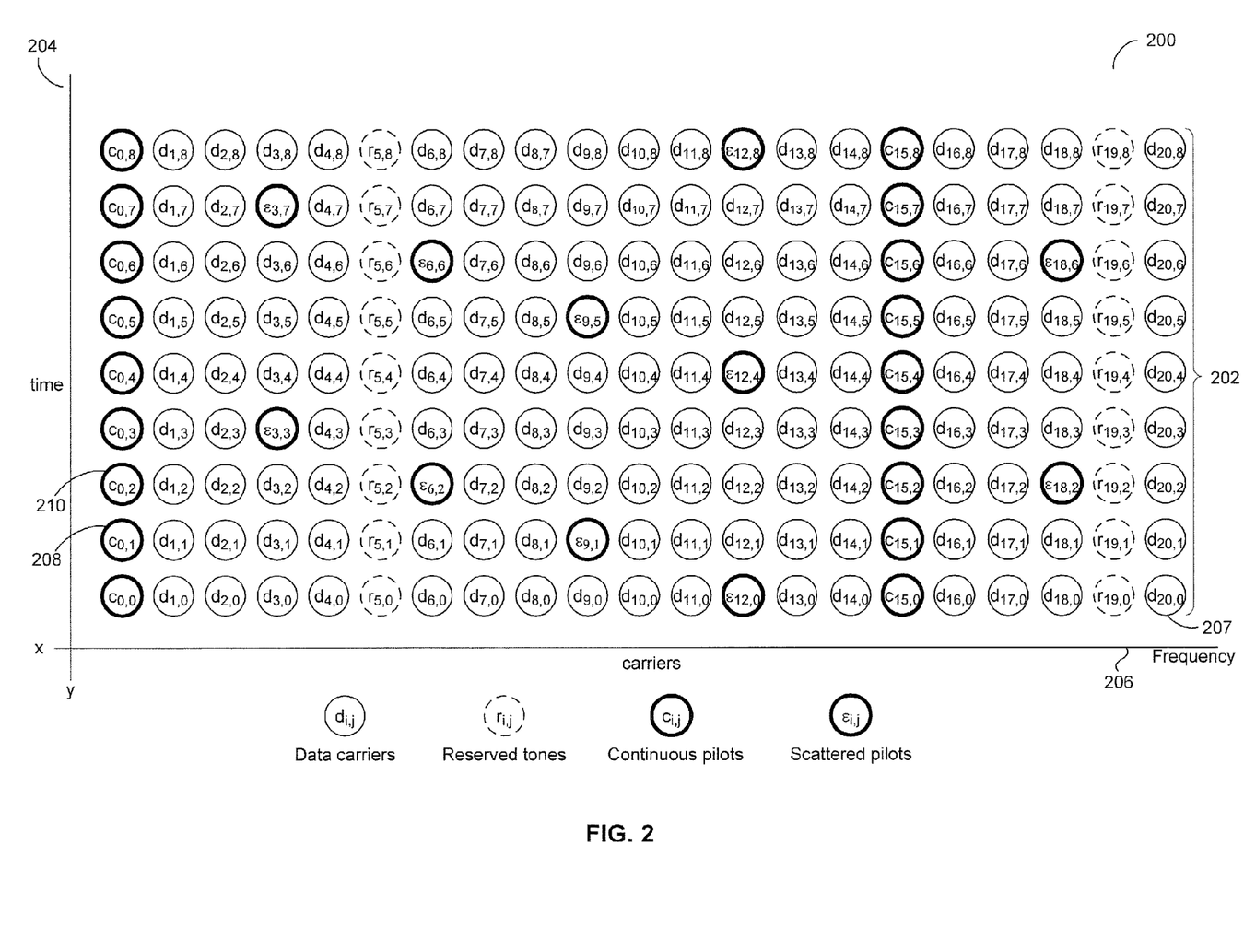
FIG. 2 is a graphical illustration of an exemplary pilot pattern sequence.

FIG. 2 is a graphical illustration of an exemplary pilot pattern sequence 200. The pilot pattern sequence 200 includes a symbol group 202 of nine OFDM symbols arranged along Y axis 204 representative of time. The Y axis 204, for example, can be in gradations of 200 microseconds (μs) up to 1 millisecond. The fidelity of these gradations is dependent upon the total duration of each of the OFDM symbols.

The graph of FIG. 2 also includes X axis 206 representative of frequency. Evenly spaced carries in each of the symbol groups are arranged along the X axis 206.

In FIG. 2, each of the symbols within the symbol group 202 includes different carrier types comprising data carries ($d_{ij}$), reserved tones ($r_{ij}$), continuous pilots ($C_{ij}$), and scattered pilots ($s_{ij}$). Although the pilot sequence 200 is representative of a sequence configured for use in a DVB-T2 system, it can apply to any OFDM system.

The first element in the carrier type subscript (e.g. $d_{ij}$) represents a carrier index. The second element of the subscript represents a time index. For example, in FIG. 2, a first OFDM symbol 207, occurring at time 0, includes a continuous pilot $c_{0,0}$, a data carrier $d_{1,0}$ a data carrier $d_{2,0}$, etc.

In an OFDM symbol, the data carriers are representative of actual transmitted data. The continuous pilots and the scattered pilots are provided to be able to perform channel estimation. For the symbol 207, the continuous pilots are $c_{0,0}$ and $C_{0,15}$. The symbol 207 also includes a scattered pilot $s_{12,0}$. The notion of why two different types of pilots are used is well understood by those of skill in the art and will not be discussed herein.

Focusing on other aspects of pilots tones, most OFDM systems include the concept of having pilots that are not located within any particular system. For example, in the symbol group 202, all of the continuous pilots have a carrier index identical to other carrier pilots, meaning they are in vertical columns with other continuous pilots. For example, there are continuous pilots at carrier index "0" and carrier index "15." The fact that the continuous pilots are all vertically aligned indicates the pilot location stays the same, across different symbols. That is, if carrier 0 is a pilot in symbol 0 (i.e., symbol 207), then carrier 0 is also a pilot in a symbol 208, and a pilot in symbol 210, etc. This process is typical of DVB-T systems and wireless local area network (LAN) systems.

The problem, however, with pilot configurations such as the configuration of FIG. 2 is that the density of the continuous pilots is typically insufficient to adequately perform channel estimation. To compensate for this lack of continuous pilot density, roving or "scattered" pilots are provided to augment the channel estimation capability of the continuous pilots. In FIG. 2, as discussed above, in the symbol 207 the scattered pilot is denoted as $S_{12,0}$. The symbol 208 includes a scattered pilot $S_{9,1}$ etc. These are the typical types of pilots that can be found in conventional OFDM systems.

As noted above, all of the pilot carriers are evenly spaced along the X axis 206. In traditional OFDM systems, the value of these pilot carriers is derived from the output of a linear feedback shift register (LFSR). More specifically, an LFSR is used to produce a pseudorandom binary sequence (PRBS). The PRBS includes a series of binary values and is used to modulate reference information ultimately transmitted in the form of continuous and scattered pilots. Thus, the output of the LFSR is used to determine the value(s) of the continuous and scattered pilots. This technique is used, for example, in current (DVB-T) systems discussed above.

Figure 3:
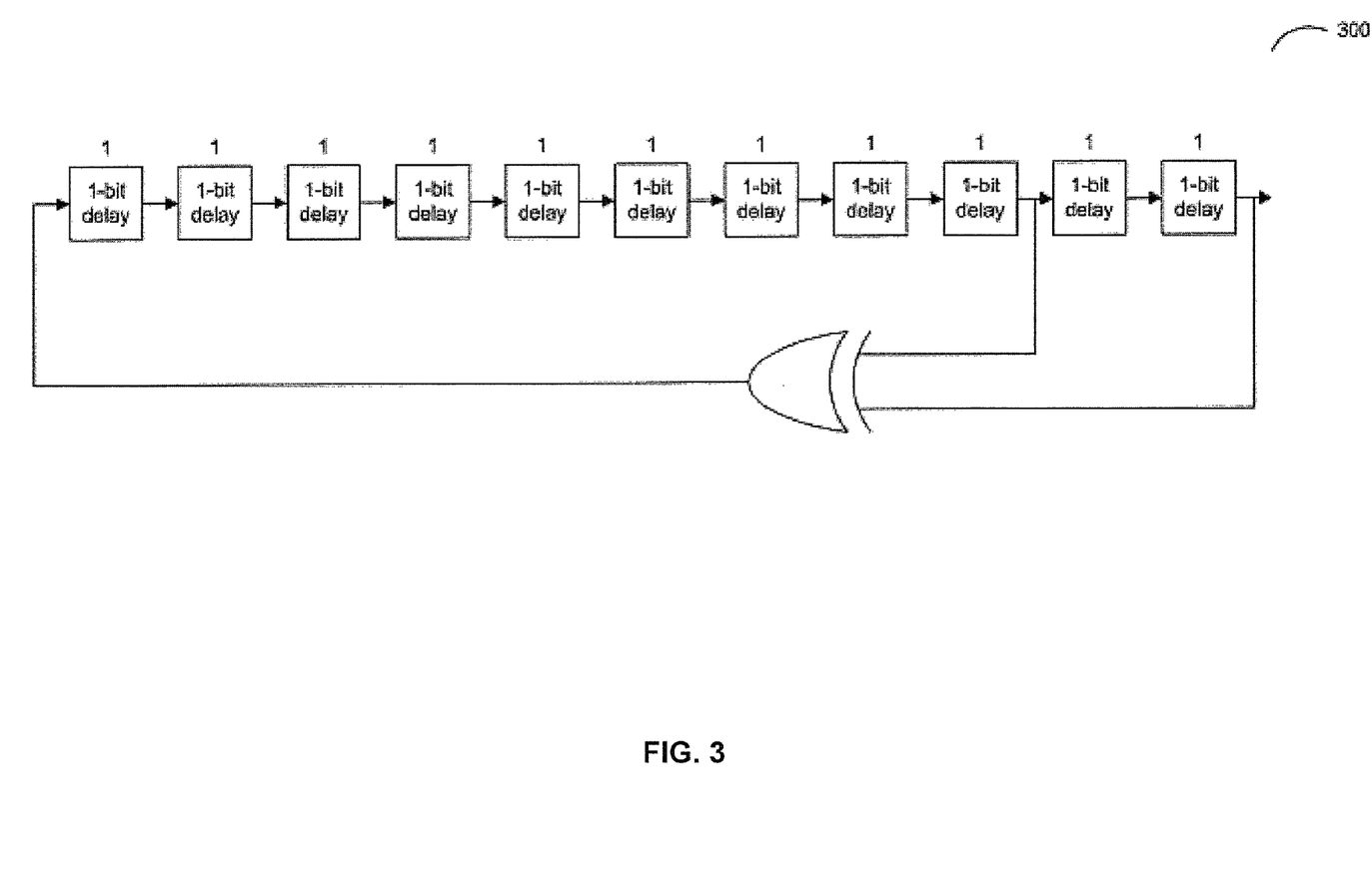
FIG. 3 is an illustration of an exemplary linear feedback shift register.

FIG. 3 is an illustration of an exemplary LFSR 300 that can be used to produce a PRBS in accordance with the present invention. By way of example, the LFSR 300 is a component within the pilot symbol inserter 110, illustrated in FIG. 1.

As known to those of skill in the art randomly generated sequences are not entirely random. That is, all randomly generated sequences eventually repeat themselves over time. For example, a sequence of 100110001, output from the LFSR 300, would repeat over time. If, in addition to the repeatability aspect of the PRBS, additional properties of the PRBS could be known or predicted, more clever techniques can be used to aid the receiver in performing synchronization. More clever techniques would ultimately make the synchronization process more efficient and permit simpler OFDM receiver designs.

Use of the PRBS in deriving values for the continuous and scattered pilot sequences requires computation of auto and cross correlations of the pilot samples. Those sequences that have good auto and cross correlation properties are the best choices for pilot sequences. For example, the autocorrelation of a typical PRBS can be computed in the binary domain. If the autocorrelation resembles an impulse function in the binary domain (i.e., suggesting that there is only one high non-zero value and the remaining values are very low non-zero values), then this particular autocorrelation computation can be used to at least determine when the sequence began within the received symbol. Knowing when the sequence began in the received symbol is useful in speeding the acquisition and synchronization process, and minimizing the occurrence of symbol ambiguities.

A variant of the PRBS autocorrelation technique above has been used in multicarrier systems for years, being applied, however, only in time domain. The present invention can be applied in OFDM based systems in frequency domain. That is, embodiments of the present invention compute the autocorrelation of the PRBS in the binary field and not on actual numbers. Time domain autocorrelation performed over real/complex numbers does not translate easily to a PRBS in the frequency domain. The present invention is formulated upon the concept that a "good" long PRBS in the binary domain (which is easy to find) works well after transformation to real/complex numbers via modulation.

Figure 4A:
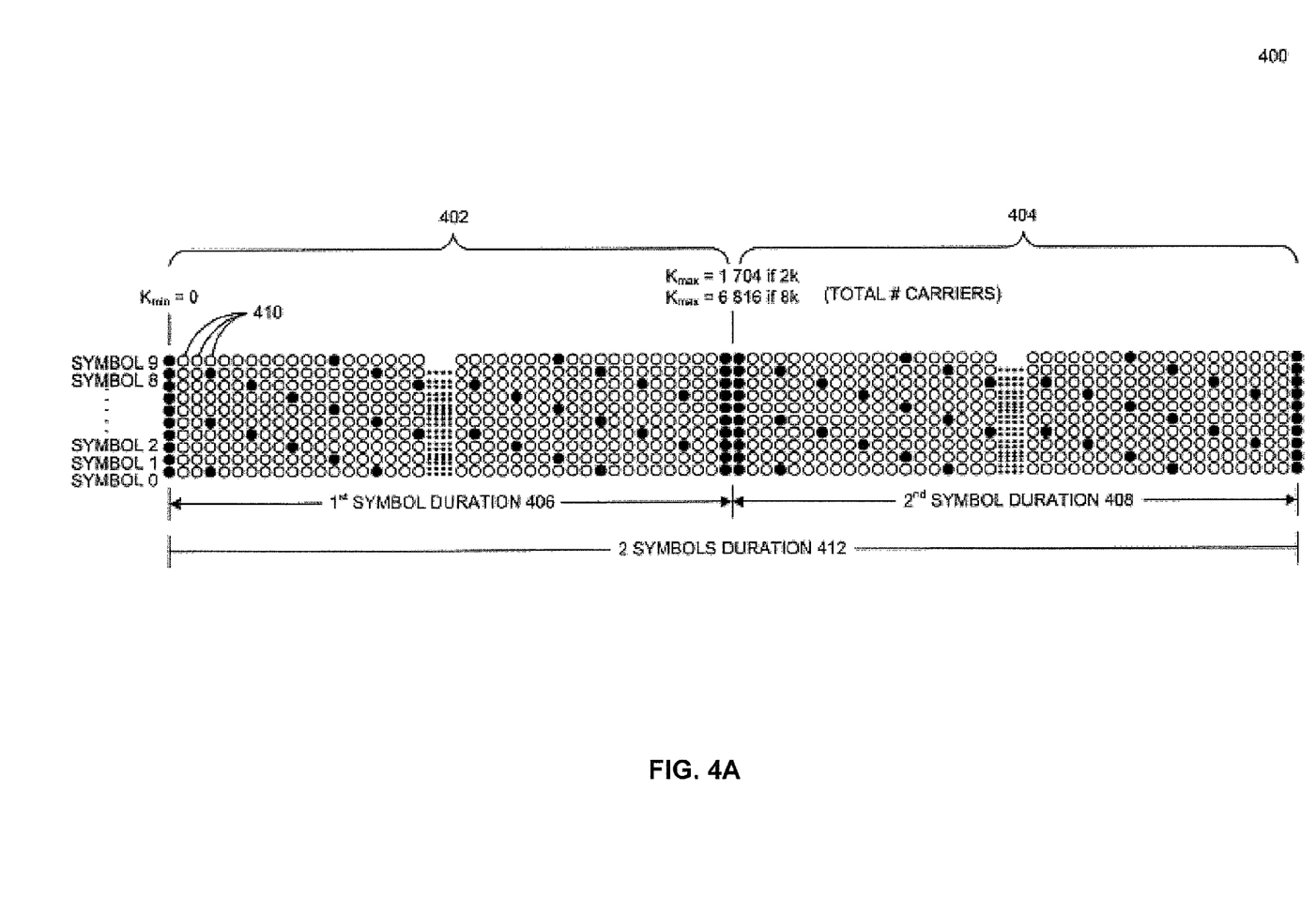
FIG. 4A is an illustration of a two symbol time duration sequence.

FIG. 4A is a graphical illustration 400 of two OFDM symbols, combine to represent two symbol durations in time. More specifically, in the illustration 400, a first group of multi-carrier symbols 402 and a second group of multi-carrier symbols 404 are shown. The first group 402 includes symbols 0 to 9, each having a 1.sup.st symbol duration of time 406. The second group of symbols 404 includes a 2.sup.nd symbol duration time 408. The first group of symbols 402 can include 1704 individual carriers, such as the carriers 410, if the OFDM system operates in the 2K mode. The first group of symbols 402 will include 6816 carriers, however, if the 8K mode is used.

In the present invention, the pseudorandom sequence used to derive the scattered and pilot carrier sequences is desirably at least twice as long as any transmitted symbol (i.e. at least two symbols duration). If at least twice as long as the transmitted symbol, symbol ambiguities can be more easily resolved. For example, if a particular sequence is only six values long, embodiments of the present invention provide the ability to determine any errors to within, for example, +/− three values.

In OFDM systems designed in accordance with the present invention, a Gold sequence is used. That is, to create a PRBS in accordance with the present invention, an LFSR, such as the LFSR 300, can be configured to produce a Gold sequence (with good autocorrelation properties) instead of the traditional PRBS used in conventional OFDM systems.

As understood by those of skill in the art, a Gold sequence includes $2^m+1$ sequences each one with a period of $2^m-1$. This Gold sequence is desirably at least as long as the complete scattered pilot cycle that is used, or at least two symbols duration 412. In this manner, synchronization can be achieved completely in the time domain with only two symbols wait in the time domain. More specifically, a cross-correlation of the received data with the FFT of the modulated Gold sequence over a time period of two symbols immediately provides an identifiable peak in the output that indicates where the symbol begins.

The cost to produce this Gold sequence is simply the programming or addition of two more bits in the LFSR to generate the sequence. Two more bits in the LFSR can be produced by modifying the LFSR 300 of FIG. 3. A modified version of the LFSR 300 is shown in FIG. 4B.

Figure 4B:
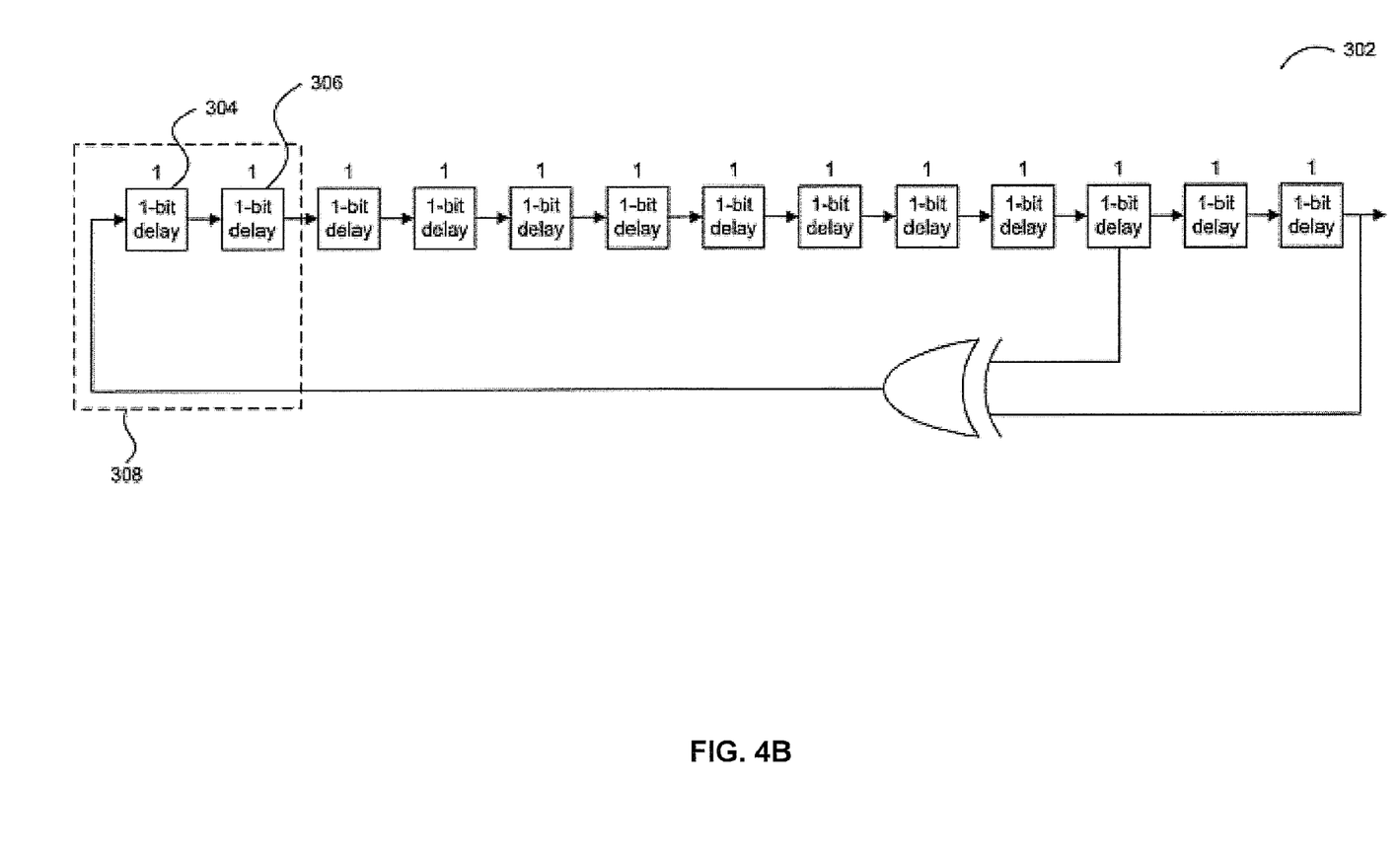
FIG. 4B is an illustration of an exemplary linear feedback shift register modified in accordance with the present invention.

In FIG. 4B, the LFSR 302 (e.g., a modified version of the LFSR 300) can be produced by adding two more 1-bit delay blocks, such as the 1-bit delay blocks 304 and 306 of extended module 308. In simpler terms, the present invention permits reusing a longer sequence, configured for use with the largest FFT size, with smaller FFT sizes, thereby decreasing the number of LFSRs that have to be created. This approach ultimately simplifies the receiver.

Embodiments of the present invention are particularly applicable to DVB-T systems. Most digital television standards that are based on OFDM have multiple FFT sizes. That is, the number of carriers in one symbol could either be 2000 carriers (2K mode), or roughly 8000 (8K mode). In conventional OFDM systems, in order to resolve all the ambiguities within one symbol, the PRBS sequence must be as long as the length of one symbol. Using this conventional approach, however, a different LFSR would be required for each FFT size in the receiver chip.

In the present invention, the pseudorandom sequence (e.g., Gold code) is designed to be long enough such that its receiver correlation can occur over multiple symbols (i.e., twice as long as a single symbol), permitting the same sequence to be used for all the OFDM FFT sizes.

Desirably, the sequence length should be twice as long as the number of active carriers in the largest FFT size. For shorter FFT sizes, the sequence length will be greater than twice the corresponding number of active carriers. For the shorter FFT sizes, however, this longer sequence does not slow down synchronization because the largest FFT size is the only one tested. The results for all smaller FFT sizes fall out as side information, thus precluding the need for testing the smaller FFT sizes.

Figure 5:
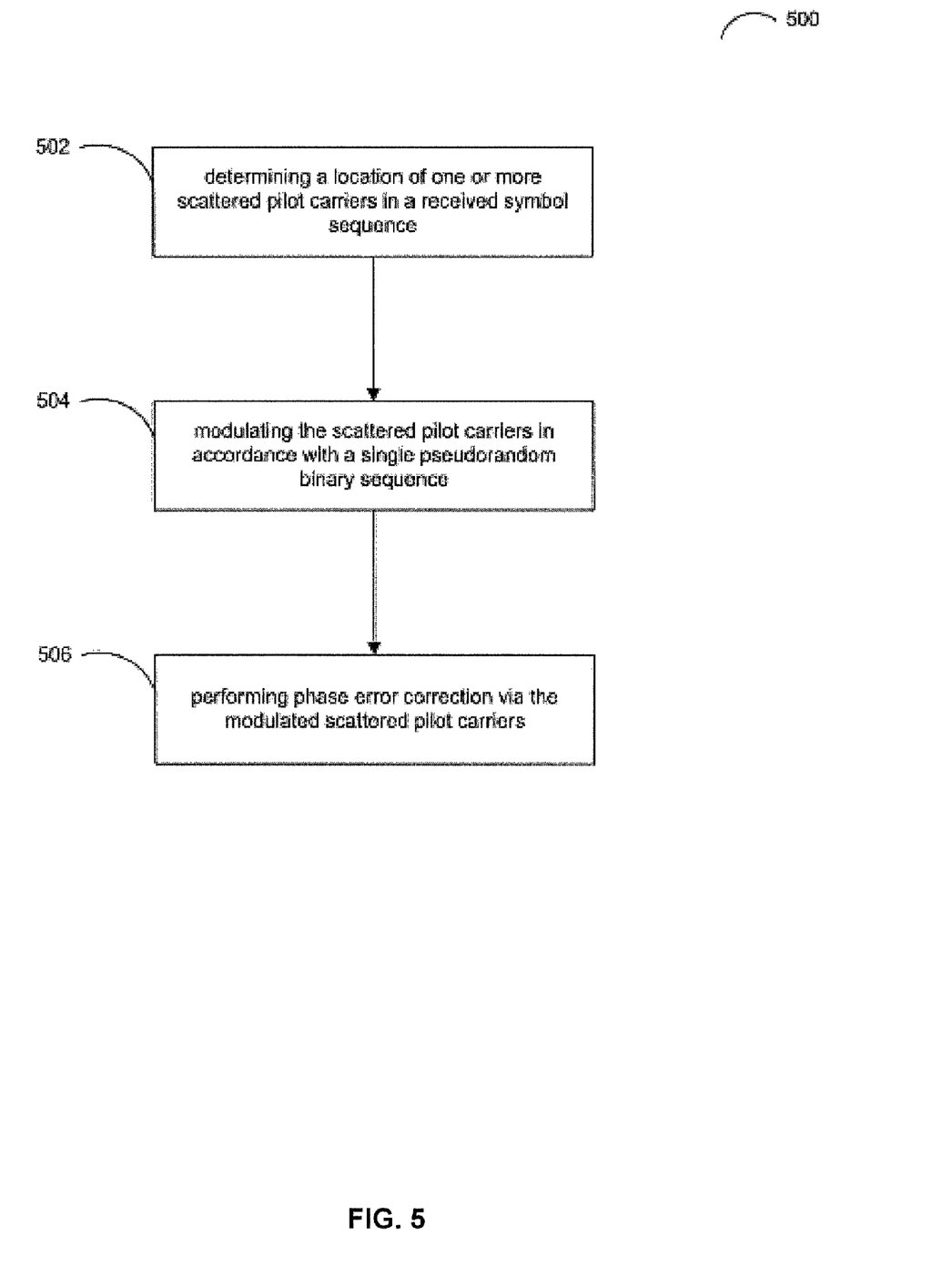
FIG. 5 is an exemplary flowchart of a method of practicing an embodiment of the present invention.

FIG. 5 is a flowchart of an exemplary method 500 of practicing an embodiment of the present invention. In FIG. 5, a step 502 includes determining a location of one or more scattered pilot carriers in a received symbol sequence and modulating the scattered pilot carriers in accordance with a single pseudorandom binary sequence, as indicated in a step 504. In step 506, phase error correction is performed via the modulated scattered pilot carriers.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for receiver synchronization.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
   determining a location of one or more scattered pilot carriers in a received symbol sequence;
   modulating the one or more scattered pilot carriers in accordance with a single pseudorandom binary sequence, wherein a duration of the single pseudorandom binary sequence is at least two symbol times of a same symbol; and
   performing phase error correction via the modulated one or more scattered pilot carriers.

2. The method according to claim 1, comprising:
   determining a location of one or more continuous pilot carriers; and
   performing coarse and fine synchronization using the continuous pilot carriers.

3. The method according to claim 2, wherein the coarse and fine synchronization are performed in time domain.

4. The method of claim 1, wherein the pseudorandom sequence is a Gold code.

5. The method of claim 4, wherein the Gold code has a duration of at least a complete scattered pilot cycle associated with the one or more scattered pilot carriers.

6. The method of claim 1, wherein the multi-carrier receiver operates in accordance with orthogonal frequency division multiplexing (OFDM) principles.

7. The method of claim 1, wherein the at least two symbol times of the same symbol correspond to at least two symbols of a transmitted symbol.

8. The method of claim 1, wherein the pseudorandom binary sequence is produced by a linear feedback shift register (LFSR).

9. A non-transitory computer program product including a computer readable medium storing program code, which when executed by a processor cause the following method to be carried out:
   determining a location of one or more scattered pilot carriers in a received symbol sequence;
   modulating the one or more scattered pilot carriers in accordance with a single pseudorandom binary sequence, wherein a duration of the single pseudorandom binary sequence is at least two symbol times of a same symbol; and
   performing phase error correction via the modulated one or more scattered pilot carriers.

10. A non-transitory computer program product according to claim 9, comprising: determining a location of one or more continuous pilot carriers; and performing coarse and fine synchronization using the continuous pilot carriers.

11. A non-transitory computer program product according to claim 10, wherein the coarse and fine synchronization are performed in time domain.

12. A non-transitory computer program product according to claim 9, wherein the pseudorandom sequence is a Gold code.

13. A non-transitory computer program product according to claim 9, wherein the multi-carrier receiver operates in accordance with orthogonal frequency division multiplexing (OFDM) principles.

14. A system for signal processing, the system, comprising: one or more circuits for use in a receiver configured to operate in an orthogonal frequency division multiplexing (OFDM) system, wherein said one or more circuits are operable to:
   determine a location of one or more scattered pilot carriers in a received symbol sequence;
   modulate the one or more scattered pilot carriers in accordance with a single pseudorandom binary sequence, wherein the single pseudorandom binary sequence is a Gold sequence having a duration of at least two symbol time of a same symbol; and
   perform phase error correction via the modulated one or more scattered pilot carriers.

15. The system of claim 14, wherein said one or more circuits are operable to: determining a location of one or more continuous pilot carriers; and perform coarse and fine synchronization using the continuous pilot carriers.

16. The system of claim 15, wherein the coarse and fine synchronization are performed in time domain.

* * * * *